United States Patent [19]

Willis et al.

[11] Patent Number: 4,989,998
[45] Date of Patent: Feb. 5, 1991

[54] BEARINGS

[75] Inventors: Michael G. Willis, Wembley; Ewan N. F. Robbie, Maidenhead, both of England

[73] Assignee: Vandervell Limited, Maidenhead, England

[21] Appl. No.: 437,904

[22] Filed: Nov. 17, 1989

[30] Foreign Application Priority Data

Nov. 25, 1988 [GB] United Kingdom ................. 8827606

[51] Int. Cl.$^5$ .............................................. F16C 17/10
[52] U.S. Cl. ...................................... 384/275; 384/294; 384/295
[58] Field of Search ................ 384/275, 294, 296, 295, 384/288

[56] References Cited

U.S. PATENT DOCUMENTS

| 3,713,714 | 1/1973 | Hill et al. | 384/294 |
| 4,017,127 | 4/1977 | Smith et al. | 384/294 |
| 4,702,624 | 10/1987 | Fontana | 384/294 |

FOREIGN PATENT DOCUMENTS

| 2210113 | 5/1989 | United Kingdom . |
| 1386253 | 3/1975 | United Kingdom . |
| 1297559 | 11/1972 | United Kingdom . |

Primary Examiner—Lenard A. Footland
Attorney, Agent, or Firm—William R. Hinds

[57] ABSTRACT

Flanged bearings are described wherein flanges are joined to a journal bearing by means of co-operating lugs on the flange and slots in the journal bearing end face. The lugs are offset from the remainder of the flange material in order to provide increased mechanical interlocking after machining of the bearing.

4 Claims, 2 Drawing Sheets

BEARINGS

The present invention relates to bearings and particularly to bearings of the flanged type having flanges which are separately manufactured and attached during manufacture to form as integrally flanged bearing.

In British Pat. Nos. 1297559 and 1386253, flanged bearings are described. These bearings are constructed by forming radially inwardly directed lugs on the inner periphery of an annular thrust bearing and which lugs co-operate with slots or recesses formed in one or both end faces of a thin wall half bearing liner. The circumferentially outer edges of the slots or recesses are then deformed such as to prevent detachment of the thrust bearing in the axial direction and still allow relative mutual movement between the components.

It has been found that where such bearings are proposed for use in engines with crankshafts having relatively large fillet radii at the journal axial ends that the amount of material required to be machined away at the junction between the half bearing end face and the thrust washer inner periphery leaves only a relatively small amount of interlocking material.

According to the present invention a flanged bearing comprises a thin wall bearing liner and at least one substantially planar thrust flange attached to a bearing liner end face, the thrust flange having at least one radially inwardly directed lug on the inner periphery, which lug cooperates with a slot formed in the bearing liner end face, the circumferentially outer edges of which slot are deformed such as to retain the thrust flange on the bearing liner in the axial direction, wherein the material comprising the at least one lug at its region of attachment to the liner is axially inwardly offset relative to the plane of the axially inner face of the material comprising the remainder of the thrust flange.

Preferably there are two or more co-operating lugs and slots per thrust flange.

In one embodiment there may be a thrust flange at each bearing liner axial end face.

Preferably the lug may be offset from the remainder of the thrust flange by means of shearing with a press tool.

Alternatively, the plane of the lug and the plane of the remainder of the thrust flange may be mutually offset by machining or bending methods.

In order that the present invention may be more fully understood an example will now be described by way of illustration only with reference to the accompanying drawings, of which;

Figure 1:
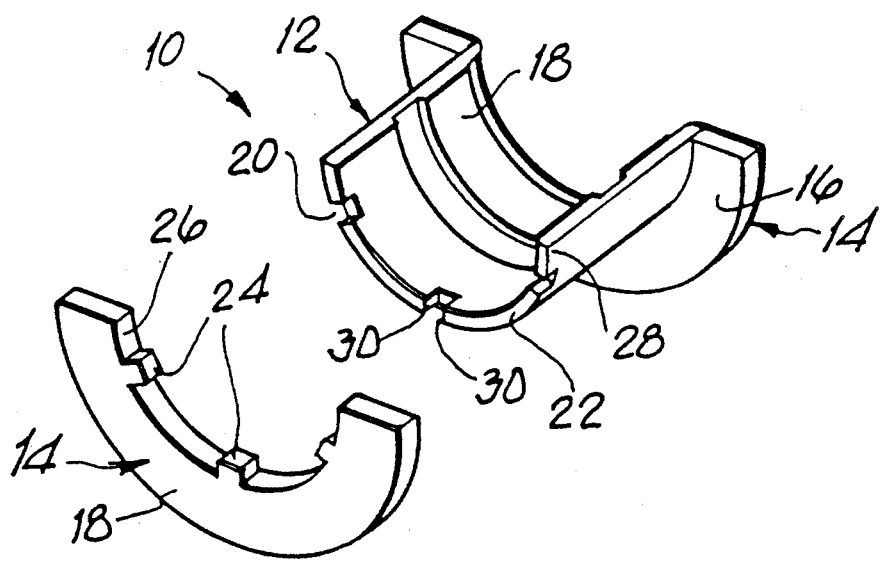
FIG. 1 shows a prior art flanged bearing according to GB No. 1386253.
Figure 2:
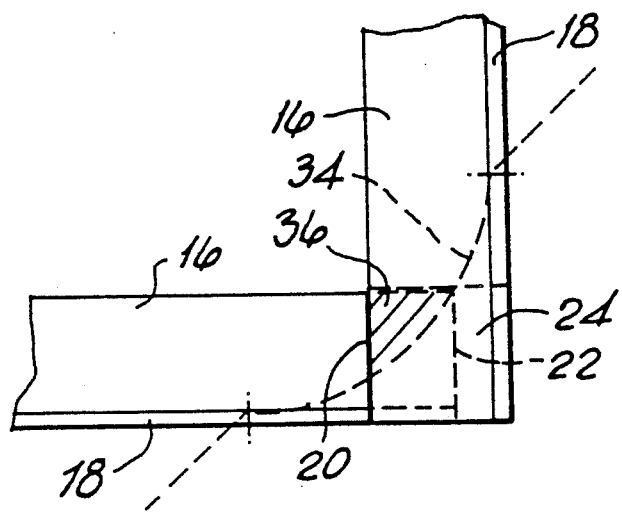
FIG. 2 shows a cross section through the end face/joint region of the prior art bearing of FIG. 1 after machining.

Referring now to FIGS. 1 and 2 and where the same features are denoted by common reference numerals. A flanged bearing is shown generally at 10, the bearing comprising a thin-wall half bearing liner 12 and two thrust flanges 14. Three slots 20 are formed in each bearing end face 22 (only one end face is shown). Both the liner and the flanges are made from strip material having a steel backing 16 and a bearing alloy lining 18. The slots 20 co-operate with three radially inwardly directed lugs 24 formed on the inner periphery 26 of the flange such that when the slots and lugs are engaged the inner periphery 26 lies adjacent the outer periphery 28 of the bearing liner backing. Axial disengagement of the flange from the liner is prevented by the outer corners 30 of the slots being deformed towards one another and thus over the lug outer edges. In this manner the liner and flange are allowed slight mutual relative movement.

After assembly the end face region of the liner and flange are machined to accept the end fillet radius of a co-operating crankshaft journal (not shown). The machined profile to accommodate the fillet radius is represented by the dashed line 34 in FIG. 2 which is a schematic section taken through a co-operating lug and slot of FIG. 1. It may be seen that after machining the only interlocking metal remaining is that shown by the hatched area 36 and that the majority of the deformed corners 30 will also have been removed.

Figure 4:
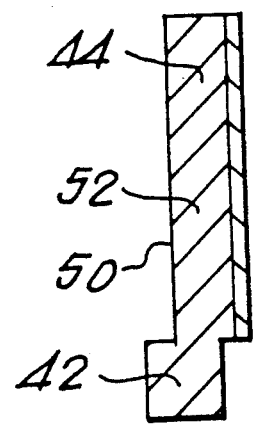
FIG. 4 shows a section through the thrust flange of FIG. 3 on the line AA.
Figure 3:
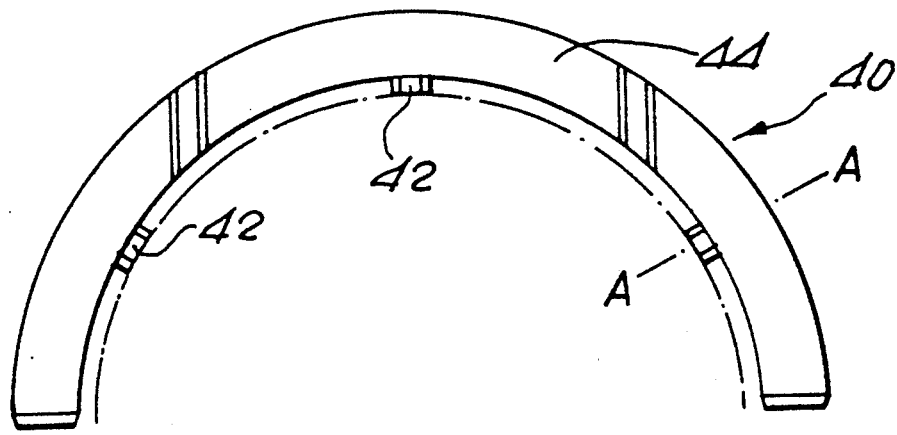
FIG. 3 shows an elevation of a thrust flange for a flanged bearing according to the present invention.

FIGS. 3 and 4 show a thrust flange 40, again having three lugs 42. The lugs 42 are offset out of the plane of the thrust bearing annulus 44 and the co-operating slots 46 in half bearing liner 48 are correspondingly deeper in the axial direction. The deeper slots are to ensure that the spatial position of the inner face 50 of the steel backing 52 remains constant for a given bearing housing (not shown).

Figure 5:
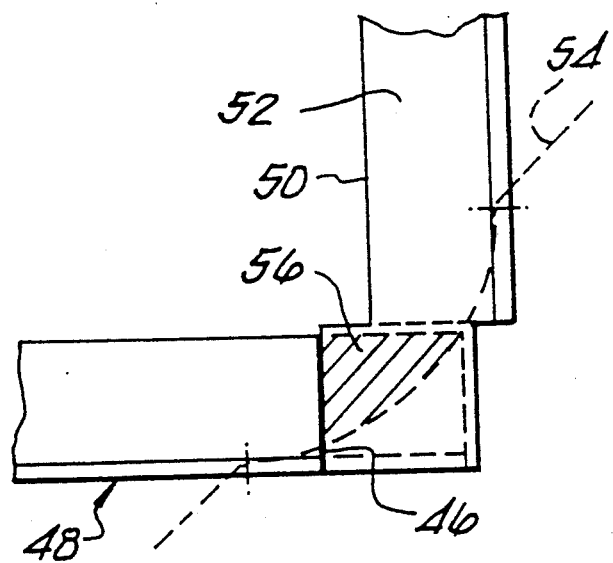
FIG. 5 shows a cross section through the bearing including the thrust flange of FIG. 3 after machining to accommodate the same housing and crankshaft as in FIG. 2.

It may be seen in FIG. 5 that after machining to the desired profile indicated by the dashed line 54 the interlocking cross sectional area shown by the hatched area 56 is considerably greater than the area 36 of FIG. 2. The amount of metal remaining from the deformed corners of the slots 46 is also greatly increased thus enhancing the mechanical integrity of the assembled bearing.

We claim:

1. A flanged bearing, the bearing comprising a thin wall bearing liner and at least one substantially planar thrust flange attached to a bearing liner end face, said thrust flange having at least one radially inwardly directed lug on the inner periphery and which lug co-operates with a slot formed in the bearing liner end face, the circumferentially outer edges of which slot are deformed such as to retain said thrust flange on said bearing liner in the axial direction, wherein the material comprising said at least one lug at its region of attachment to said liner is axially inwardly offset relative to the plane of the axially inner face of the material comprising the remainder of said thrust flange.

2. A bearing according to claim 1 having two or more co-operating lugs and slots per thrust flange.

3. A bearing according to claim 2 wherein there is a thrust flange at each of said end faces.

4. A bearing according to claim 1 wherein there is a thrust flange at each of said end faces.

* * * * *